United States Patent [19]

Kojima et al.

[11] Patent Number: 6,103,805
[45] Date of Patent: Aug. 15, 2000

[54] POLYAMIDE RESIN COMPOSITION AND MOLDED ARTICLES

[75] Inventors: Kazushige Kojima; Tsuneo Tamura; Koji Fujimoto; Sachiko Kokuryo, all of Kyoto, Japan

[73] Assignee: Unitika Ltd., Hyogo, Japan

[21] Appl. No.: 09/100,889

[22] Filed: Jun. 22, 1998

[30] Foreign Application Priority Data

Jun. 20, 1997 [JP] Japan ................................. 9-163698
Apr. 13, 1998 [JP] Japan ................................ 10-100797

[51] Int. Cl.⁷ ........................... C08J 3/00; C08K 3/34; C08K 11/00; C08L 77/00
[52] U.S. Cl. .................... 524/442; 428/474.4; 523/206; 523/216; 524/401; 524/424; 524/430; 524/433; 524/437; 524/438; 524/443; 524/445; 524/446; 524/447; 524/451; 524/606; 524/607; 524/714; 524/789; 524/791; 524/879
[58] Field of Search ........................ 524/401, 424, 524/430, 433, 437, 442, 438, 443, 445, 446, 447, 451, 606, 607, 714, 789, 791, 879; 523/206, 216; 428/474.4

[56] References Cited

U.S. PATENT DOCUMENTS

| | | | |
|---|---|---|---|
| 4,739,007 | 4/1988 | Okada et al. ......................... | 524/789 |
| 4,894,411 | 1/1990 | Okada et al. ......................... | 524/710 |
| 5,414,042 | 5/1995 | Yasue et al. .......................... | 524/789 |

FOREIGN PATENT DOCUMENTS

| | | |
|---|---|---|
| 0 358 415 A1 | 3/1990 | European Pat. Off. . |
| 0 398 551 A2 | 11/1990 | European Pat. Off. . |
| 0 605 005 A2 | 7/1994 | European Pat. Off. . |
| 3232865 A1 | 4/1987 | Germany . |
| 3808623 A1 | 10/1988 | Germany . |
| 62-74957 | 4/1987 | Japan . |
| 63-230766 | 9/1988 | Japan . |
| 2102261 | 4/1990 | Japan . |
| 37729 | 1/1991 | Japan . |
| 6248176 | 9/1994 | Japan . |

OTHER PUBLICATIONS

Database WPI, Section Ch, Week 9108, *Derwent Publications Ltd.*, London, GB, Class A23 AN 91–055784 (Abstract).

Database WPI, Section Ch, Week 9734, *Derwent Publications Ltd.*, London, GB, Class A23 AN 97–369668 (Abstract).

Database WPI, Section Ch, Week 9631, *Derwent Publications Ltd.*, London, GB, Class A23 AN 96–306667 (Abstract).

*Primary Examiner*—Patrick D. Niland
*Attorney, Agent, or Firm*—Sughrue, Mion, Zinn, Macpeak & Seas, PLLC

[57] ABSTRACT

A polyamide resin composition comprising (A) a reinforced polyamide resin which comprises 100 parts by weight of a nylon 6 homopolymer or copolymer and 1 to 20 parts by weight of a layered silicate uniformly dispersed in the polymer on the molecular level and (B) a non-reinforced polyamide resin, a test specimen of said composition having a tensile weld strength of 45 MPa or higher and a flexural modulus of 4 GPa or higher.

26 Claims, No Drawings

POLYAMIDE RESIN COMPOSITION AND MOLDED ARTICLES

FIELD OF THE INVENTION

This invention relates to a polyamide resin composition having dispersed therein a layered silicate on the molecular level, which provides molded articles excellent in mechanical strength, such as weld strength and flexural modulus, and heat resistance.

BACKGROUND OF THE INVENTION

Polyamide resin compositions reinforced with fibrous reinforcing materials such as glass fiber and carbon fiber or inorganic fillers such as calcium carbonate are widely known. However, since these reinforcing materials have poor affinity to polyamide, the reinforced polyamide compositions have reduced toughness while mechanical strength and heat resistance are improved. Further, molded articles of a fiber-reinforced polyamide resin composition suffer from appreciable warp. Besides, in using the inorganic fillers, substantial improvement in mechanical strength or heat resistance cannot be obtained unless they are added in a large quantity.

In order to eliminate these disadvantages of conventional reinforced polyamide, resin compositions comprising polyamide and a layered silicate typified by montmorillonite have been proposed as disclosed in JP-A-62-74957, JP-A-63-230766, JP-A-2-102261, and JP-A-3-7729 (the term "JP-A" as used herein means an "unexamined published Japanese patent application").

These proposed resin compositions are composite materials in which polyamide chains enters the spacings between the layers of a layered silicate so that the layered silicate is uniformly dispersed on the molecular level. In using montmorillonite as a layered silicate, it is indispensable, as described in the above publications, to treat montmorillonite with a swelling agent, such as an ammonium or onium salt of an aminocarboxylic acid, to widen the spacing between layers before compounding with polyamide or the monomer providing polyamide.

In this situation, the inventors of the present invention previously proposed that a polyamide composite excellent in mechanical strength and heat resistance can be obtained without pretreatment with a swelling agent such as an aminocarboxylic acid by polymerizing a polyamide-forming monomer(s) to which specific swelling fluoromica has been added (JP-A-6-248176). However, the polyamide composition containing the swelling fluoromica as well as the polyamide composition containing montmorillonite, one of layered silicates, still have the problem that the molded articles obtained therefrom have a lower weld strength than those obtained from polyamide only.

SUMMARY OF THE INVENTION

An object of the present invention is to provide a polyamide resin composition in which a layered silicate is uniformly dispersed on the molecular level and which provides molded articles excellent in mechanical strength, such as weld strength and flexural modulus, heat resistance, and the like.

As a result of extensive studies, the inventors have found that the above outstanding problems can be solved by blending a nylon 6 homopolymer or a copolymer thereof having uniformly dispersed therein a specific amount of a layered silicate with a non-reinforced polyamide resin.

The present invention provides a polyamide resin composition comprising (A) a reinforced polyamide resin which comprises 100 parts by weight of a nylon 6 homopolymer and 1 to 20 parts by weight of a layered silicate uniformly dispersed in the nylon 6 homopolymer on the molecular level and (B) a non-reinforced polyamide resin, a test specimen of the composition having a tensile weld strength of 45 MPa or higher and a flexural modulus of 4 GPa or higher.

The present invention also provides a polyamide resin composition comprising (A') a reinforced polyamide resin which comprises 100 parts by weight of a nylon 6 copolymer comprising not less than 80 mol % of a caproamide unit and 1 to 20 parts by weight of a layered silicate uniformly dispersed in the nylon 6 copolymer on the molecular level and (B) a non-reinforced polyamide resin, a test specimen of the composition having a tensile weld strength of 45 MPa or higher and a flexural modulus of 4 GPa or higher.

DETAILED DESCRIPTION OF THE INVENTION

The reinforced polyamide resin (A) or (A') (hereinafter inclusively referred to as reinforced polyamide resin A) comprises polyamide having uniformly dispersed therein a layered silicate on the molecular level. The language "on the molecular level" as used herein means that the layers of the layered silicate are 20 Å or more spaced from each other in average. The spacing between layers of the layered silicate is the distance between the centers of gravity of every layered of a layered silicate. The language "uniformly dispersed" as used herein means that individual laminae or laminates having not more than 5 laminae, in average, of a layered silicate are present in parallel with each other and/or at random, not less than 50%, preferably 70% or more, of the laminae or laminates being dispersed without forming masses. More specifically, such a dispersed state can be confirmed by disappearance of the peak attributed to the thickness direction of a layered silicate from the wide-angle X-ray diffraction pattern of a pellet of reinforced polyamide resin (A).

The polyamide resin constituting reinforced polyamide resin (A) is a nylon 6 homopolymer or a nylon 6 copolymer comprising not less than 80 mol % of a caproamide unit.

The nylon 6 homopolymer is obtained by polymerizing $\epsilon$-caprolactam or 6-aminocaproic acid.

The nylon 6 copolymer comprising not less than 80 mol % of a caproamide unit is obtained by copolymerizing not less than 80 mol % of $\epsilon$-caprolactam or 6-aminocaproic acid and less than 20 mol % of a comonomer(s), such as a lactam, an aminocarboxylic acid, and a nylon salt. Specific examples of the copolymer are a nylon 6/46 (tetramethylene adipamide) copolymer, a nylon 6/66 (hexamethylene adipamide) copolymer, a nylon 6/610 (hexamethylene sebacamide) copolymer, a nylon 6/612 (hexamethylene dodecamide) copolymer, a nylon 6/116 (undecamethylene adipamide) copolymer, a nylon 6/11 (undecamide) copolymer, a nylon 6/12 (dodecamide) copolymer, a nylon 6/TMHT (trimethylhexamethylene terephthalamide) copolymer, a nylon 6/6 (hexamethylene isophthalamide) copolymer, a nylon 6/6T (hexamethylene terephthalamide)/ 6I (hexamethylene isophthalamide) copolymer, a nylon 6/PACM12 (bis(1-aminocyclohexyl)methane dodecamide) copolymer, a nylon 6/DMPACM12 (bis(3-methyl-4-aminocyclohexyl)methane dodecamide) copolymer, a nylon 6/MXD6 (m-xylylene adipamide) copolymer, a nylon 6/11T (undecamethylene terephthalamide) copolymer, and a nylon 6/11T(H) (undecamethylene hexahydroterephthalamide) copolymer. Preferred of them are a nylon 6/46 copolymer, a nylon 6/66 copolymer, a nylon 6/11 copolymer, and a nylon 6/12 copolymer. A nylon 6/66 copolymer and a nylon 6/12 copolymer are particularly preferred.

It is preferred for both the nylon 6 homopolymer and copolymers to have a relative viscosity ranging from 1.5 to 5.0 as measured at a concentration of 1 g/dl in 96 wt % concentrated sulfuric acid at 25° C.

The layered silicate which constitutes reinforced polyamide resin (A) has a layer structure made up of negatively charged laminae consisting mainly of a silicate and cations intercalated therebetween. Suitable layered silicates include smectite group minerals (e.g., montmorillonite, beidellite, saponite, hectorite, and sauconite), vermiculite group minerals (e.g., vermiculite), mica group minerals (e.g., fluoromica, muscovite, paragonite, phlogopite, biotaite, and lepidolite), szaibelyte group minerals (e.g., margarite, clintonite, and anandite), and chlorite group minerals (e.g., donbassite, sudoite, cookeite, clinochlore, chamosite, and nimite).

These layered silicates naturally occurs or can be artificially synthesized. They may be modified or swelled with an organic salts, such as an ammonium or onium salt of an aminocarboxylic acid.

Of the above-described layered silicates, swelling fluoromica group minerals, represented by the following formula, are the most preferred for their whiteness.

$$\alpha(MF) \cdot \beta(aMgF_2 \cdot bMgO) \cdot \gamma SiO_2$$

wherein M represents sodium or lithium; and $\alpha$, $\beta$, $\gamma$, a, and b each represent a coefficient satisfying $0.1 \leq \alpha \leq 2$, $2 \leq \beta \leq 3.5$, $3 \leq \gamma \leq 4$, $0 \leq a \leq 1$, $0 \leq b \leq 1$, and a+b=1)

Swelling fluoromica group minerals can be synthesized with ease by, for example, a so-called melting method which comprises completely melting a mixture of silicon oxide, magnesium oxide, and various fluorides in an electric oven or gas oven at 1400 to 1500° C. and cooling the melt to crystallize a fluoromica group mineral and to allow the crystals to grow.

Swelling fluoromica group minerals are also obtained by a method comprising heating a mixture of talc and an alkali fluoride or an alkali silicofluoride in a porcelain crucible at 700 to 1200° C. for a short time to intercalate the alkali metal ions into the spacings of talc laminae (cf. JP-A-2-149415).

The amount of the alkali fluoride or the alkali silicofluoride to be mixed with talc is preferably in a range of from 10 to 35% by weight based on the mixture. If it is out of this range, the production yield would decrease.

The alkali metal of the alkali fluoride or the alkali silicofluoride should be sodium and lithium, which may be used singly or in combination. Potassium as this alkali metal fails to provide an swelling fluoromica group mineral but could be used in a limited amount in combination with sodium and/or lithium for the purpose of swelling control. The swelling is also controllable by adding a small amount of alumina to the mixture.

In reinforced polyamide resin (A) the amount of the layered silicate is 1 to 20 parts by weight, preferably 1 to 10 parts by weight, by weight per 100 parts by weight of the polyamide resin. If it is less than 1 part by weight, the reinforcing effect is insubstantial for obtaining molded articles having excellent mechanical strength and high heat resistance. If it is more than 20 parts by weight, no improvement in weld strength is obtained.

Non-reinforced polyamide resin (B) which is used in combination with reinforced polyamide resin (A) is a polymer having an amide linkage, which is prepared from such a monomer as a lactam or an aminocarboxylic acid or monomers such as a diamine and a dicarboxylic acid (or a nylon salt comprised of a pair of them). It is preferred for non-reinforced polyamide resin (B) to have a relative viscosity ranging from 1.5 to 5.0 as measured at a concentration of 1 g/dl in 96 wt % concentrated sulfuric acid at 25° C.

Specific examples of non-reinforced polyamide resin (B) include polycaprolactam (nylon 6), poly(tetramethylene adipamide) (nylon 46), poly(hexamethylene adipamide) (nylon 66), poly(hexamethylene sebacamide) (nylon 610), poly(hexamethylene dodecamide) (nylon 612), poly(undecamethylene adipamide) (nylon 116), polyundecamide (nylon 11), polydodecamide (nylon 12), poly(trimethylhexamethylene terephthalamide) (nylon TMHT), poly(hexamethylene isophthalamide) (nylon 6I), poly(hexamethylene terephthal/isophthalamide) (nylon 6T/6I), poly[bis(1-aminocyclohexyl)methane dodecamide] (nylon PACM12), poly[bis(3-methyl-4-aminocyclohexyl)methane dodecamide] (nylondimethyl PACM12), poly(m-xylylene adipamide) (nylon MXD6), poly(undecamethylene terephthalamide) (nylon 11T), poly(undecamethylene hexahydroterephthalamide) (nylon 11T(H)), and copolyamide or mixed polyamide thereof. Preferred of them are nylon 6, nylon 46, nylon 66, nylon 11, nylon 12, and copolyamide or mixed polyamide thereof. A nylon 6 homopolymer and a nylon 66 homopolymer are particularly preferred.

It is preferred for improving molding properties of the resulting resin composition to add 1% by weight or less of a nucleating agent to non-reinforced polyamide resin (B). Suitable nucleating agents include talc, silica, kaolin, graphite, magnesium oxide, and aluminum oxide, with talc being preferred.

Reinforced polyamide resin (A) can be prepared by mixing the monomer or monomers providing 100 parts by weight of a polyamide resin with 1 to 20 parts by weight of a layered silicate and water, and carrying out polymerization at a temperature of 240 to 300° C. under a pressure of 2 to 30 kg/cm$^2$ for 1 to 5 hours. The amount of water to be present in the polymerization system is not particularly limited but is preferably 50 to 100 parts by weight per 100 parts by weight of the layered silicate taking into consideration the yield of the reinforced polyamide resin and the performance of the molded articles. If the amount of water is less than 50 parts by weight, the polymerization solution tends to be non-uniform. If it exceeds 100 parts by weight, the polymerization needs a longer time. It should be noted that when the polymerization pressure is as high as 15 to 30 kg/cm$^2$, it is necessary to use water in an amount enough to reach that reaction pressure, for example, about 80 to 100 parts by weight per 100 parts by weight of the layered silicate.

One to ten parts by weight of an acid can be added per 100 parts by weight of the layered silicate. Addition of an acid is effective to obtain molded articles with higher rigidity and higher heat resistance. Whatever acid, either organic or inorganic, can be used as long as its pKa is 0 to 4 or negative (in 25° C. water). Useful acids include benzoic acid, sebacic acid, formic acid, acetic acid, monochloroacetic acid, dichloroacetic acid, trichloroacetic acid, trifluoroacetic acid, nitrous acid, nitric acid, phosphoric acid, phosphorous acid, hydrochloric acid, hydrobromic acid, hydroiodic acid, sulfuric acid, perchloric acid, fluorosulfonic acid-pentafluoroantimony (1:1) (available from Aldrich under the trade name of Magic Acid), and fluoroantimonic acid.

After the polymerization system is maintained under the above-described conditions, the inner pressure is once diminished to atmospheric pressure, and the produced reinforced polyamide resin is taken out in the form of strands, which are cooled to solidify and cut into pellets. The strand cut pellets are then refined in hot water at 95 to 100° C. for 6 to 12 hours, followed by drying to obtain pellets of reinforced polyamide resin (A).

The polyamide resin composition according to the present invention is prepared by blending the pellets of reinforced polyamide resin (A) and the pellets of non-reinforced polyamide resin (B) either by mere dry blending or by melt-kneading in a twin-screw extruder followed by pelletizing.

The mixing ratio of (A) to (B) is preferably 10/90 to 90/10, still preferably 25/75 to 75/25, by weight. A test specimen prepared from the polyamide resin composition having the above (A)/(B) ratio has been confirmed to have the layered silicate uniformly dispersed on the molecular level in the polyamide matrix and to have a tensile weld strength of 45 MPa or higher and a flexural modulus of 4 GPa or higher as measured according to the test methods hereinafter described.

The polyamide resin composition of the invention preferably has a relative viscosity of 1.5 to 5.0 as measured according to the method hereinafter described. If the relative viscosity is less than 1.5, the molded articles tend to have insufficient mechanical strength. If it is higher than 5.0, the molding properties of the resin composition tends to be reduced drastically.

The polyamide resin composition can be mixed with other thermoplastic polymers as far as the effects of the present invention are not impaired. In this case, it is preferable to blend the polymers into a polymer alloy by means of a kneader equipped with screws. The resulting polymer alloys exhibit improved mechanical strength and heat resistance over those prepared by blending with ordinary polyamide resins because of the uniformly dispersed layered silicate. Examples of thermoplastic polymers with which the resin composition of the present invention can be blended include elastomers, such as polybutadiene, butadiene-styrene copolymers, acrylic rubber, ethylene-propylene copolymers, ethylene-propylene-diene copolymers, natural rubber, chlorinated butyl rubber, and chlorinated polyethylene, and acid-modified elastomers (e.g., maleic anhydride modified-elastomer); styrene-maleic anhydride copolymers, styrene-phenylmaleimide copolymers, polyethylene, polypropylene, butadiene-acrylonitrile copolymers, poly(vinyl chloride), poly(ethylene terephthalate), poly(butylene terephthalate), polyacetal, poly(vinylidene fluoride), polysulfone, poly(phenylene sulfide), poly(ether sulfone), phenoxy resins, poly(phenylene ether), poly(methyl methacrylate), poly(ether ketone), polycarbonate, polytetrafluoroethylene, and polyarylate.

If desired, the polyamide resin composition can contain various additives, such as pigments, heat stabilizers, antioxidants, degradation inhibitors, weathering agents, flame retardants, plasticizers, mold release, reinforcing agents, and the like, as long as the effects of the present invention are not impaired. These additives are added to the polymerization system or while the resin composition is melt-kneaded or melt-molded.

Suitable heat stabilizers, antioxidants or degradation inhibitors include hindered phenols, phosphorus compounds, hindered amines, sulfur compounds, copper compounds, alkali metal halides, and mixtures thereof.

Suitable reinforcing agents include clay, talc, calcium carbonate, zinc carbonate, wollastonite, silica, alumina, magnesium oxide, calcium silicate, sodium aluminate, sodium aluminosilicate, magnesium silicate, glass balloons, carbon black, zeolite, hydrotalcite, metal fiber, metal whiskers, ceramic whiskers, potassium titanate whiskers, boron nitride, graphite, glass fiber, and carbon fiber.

The polyamide resin composition of the present invention can be molded through general molding methods. For example, the composition is melt-molded by injection molding, extrusion molding, blow molding, and the like into molded articles of desired shape, or a solution of the composition in an organic solvent is cast to obtain a film.

The molded articles obtained from the polyamide resin composition of the invention shows marked improvements in mechanical strength, heat resistance, and dimensional stability over those obtained from a polyamide resin alone. Further, they undergo little change in mechanical properties or dimensions under the influence of water. Molded articles which enjoy these excellent characteristics include exterior and interior parts of automobiles, such as engine covers, cylinder head covers, gas tanks, alcohol tanks, fuel strainers, brake oil tanks, clutch oil tanks, power steering oil tanks, air conditioner fluorene tubes, fluorene tanks, canister tanks, air cleaner relevances, intake manifolds, wheels, light covers, timing belt covers, etc.; hollow pipes, knobs, ink containers, curtain tracks, gear parts, bearing retainers, brushes, reels, circuit breaker covers, switches, connectors, and the like. Not being limited to these examples, the polyamide resin composition of the present invention is widely applicable in the fields where the excellent characteristics, i.e., mechanical strength, flexural modulus, heat resistance, and weld strength, can be taken advantage of.

The present invention will now be illustrated in greater detail with reference to Examples, but it should be understood that the present invention is not construed as being limited thereto. Unless otherwise noted, all the percents and parts are given by weight. The raw materials and methods of measuring physical properties used in Examples and Comparative Examples are as follows.

1. Raw Materials (1) Swelling fluoromica group mineral

A mixture of 85% of talc having been ground in a ball mill to an average particle size of 4 $\mu$m and 15% of sodium silicofluoride having the same average particle size was put in a porcelain crucible and reacted at 850° C. for 1 hour in an electric oven.

The resulting powder was analyzed by wide-angle X-ray diffractometry. As a result, the peak corresponding to the thickness of 9.2 Å in c-axis direction of the starting talc disappeared, and a peak corresponding to 12 to 13 Å was observed, which indicated production of an swelling fluoromica group mineral.

(2) Montmorillonite

Montmorillonite naturally occurring in Yamagata, Japan (with Na ions intercalated) (available from Kunimine Kogyo K.K.) was used.

(3) Hectorite

Synthetic hectorite (with Li ions intercalated) (available from Topy Industries, Ltd.) was used.

(4) Vermiculite

Synthetic vermiculite (with Li ions intercalated) (available from Topy Industries, Ltd.) was used.

2. Methods of Measurement (a) Dispersion of layered silicate in reinforced polyamide resin (A):

The dispersion of a layered silicate in the pellet of reinforced polyamide resin (A) as refined and dried was determined with a wide-angle X-ray diffractometer (RAD-rB Model, produced by Rigaku K.K.).

(b) Ratio of layered silicate in reinforced polyamide resin (A):

Precisely weighed pellets of reinforced polyamide resin (A) as refined and dried were put in a porcelain crucible and burnt at 500° C. for 24 hours in an electric oven. The residue was weighed to calculate the weight ratio of the layered silicate to 100 parts by weight of the polyamide resin (nylon 6 homopolymer, nylon 6/66 copolymer or nylon 6/12 copolymer).

(c) Ratio of caproamide unit (mol %) in nylon 6/66 copolymer or nylon 6/12 copolymer of reinforced polyamide resin (A'):

In 3 ml of deutero trifluoroacetic acid was dissolved 200 mg of reinforced polyamide resin (A) and analyzed by $^{13}C$-NMR at 25° C. with Lambda 300WB manufactured by JEOL Ltd. The above ratio was obtained from the intensity ratio of carbonyl carbon.

(d) Relative viscosity:

A 1 g/dl solution of a resinous component in 96% concentrated sulfuric acid was centrifuged at 7000 rpm for 2 hours. The supernatant liquid was filtered through a G-3 glass filter, and the relative viscosity was measured at 25° C. The amount of a layered silicate, if contained in the sample resin, was obtained by measuring the residue after combustion at 500° C. for 24 hours.

(e) Tensile weld strength:

Measured on a dumbbell shaped specimen (ASTM D-638, I type; thickness: 3.2 mm) having a weldline at the center, which was prepared by using a mold having a gate at each end thereof.

(f) Tensile strength, tensile modulus and tensile elongation at break:

Measured in accordance with ASTM D-638.

(g) Flexural strength and flexural modulus:

Measured in accordance with ASTM D-790.

(h) Izod impact strength

Measured on a notched specimen having a thickness of 3.2 mm in accordance with ASTM D-256.

(i) Heat distortion temperature:

Measured in accordance with ASTM D-648 (load: 1.86 MPa).

EXAMPLE 1

In a 30 l volume reactor were charged 10 kg of ε-caprolactam, 0.6 kg of an swelling fluoromica group mineral, and 1 kg of water, and the pressure was elevated up to 15 kg/cm$^2$ while stirring. The reaction system was maintained at a temperature of 260° C. and a pressure of 15 kg/cm$^2$ for 2 hours to conduct polymerization while gradually releasing steam, followed by pressure release to atmospheric pressure over a 1 hour period. After being left under conditions of atmospheric pressure and 260° C. for 30 minutes, the reaction mixture was withdrawn in strands, cooled to solidify, and cut to obtain pellets of reinforced polyamide resin (A) consisting of the swelling fluoromica group mineral and a nylon 6 homopolymer. The pellets were refined in 95° C. hot water for 8 hours twice and dried in vacuo.

Fifty parts by weight of the resulting pellets and 50 parts by weight of nylon 6 homopolymer pellets containing 0.3% by weight of talc and having a relative viscosity of 2.6 were mixed and injection molded in an injection molding machine (125/75MS Model, manufactured by Mitsubishi Heavy Industries, Ltd.) at a cylinder temperature of 260° C. and a mold temperature of 70° C. for an injection time of 6 seconds and a cooling time of 6 seconds to prepare 3.2 mm thick specimens for testing.

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

Comparative Example 1

In a 30 l volume reactor were charged 10 kg of ε-caprolactam, 0.3 kg of an swelling fluoromica group mineral, and 1 kg of water, and the pressure was elevated up to 15 kg/cm$^2$ while stirring. The reaction system was maintained at a temperature of 260° C. and a pressure of 15 kg/cm$^2$ for 2 hours to conduct polymerization while gradually releasing steam, followed by pressure release to atmospheric pressure over a 1 hour period. After being left under conditions of atmospheric pressure and 260° C. for 30 minutes, the reaction mixture was withdrawn in strands, cooled to solidify, and cut to obtain pellets of reinforced polyamide resin (A) consisting of the swelling fluoromica group mineral and a nylon 6 homopolymer. The pellets were refined in 95° C. hot water for 8 hours twice and dried in vacuo.

The resulting pellets was injection molded under the same conditions as in Example 1 to prepare 3.2 mm thick specimens for testing.

The specimen had a lower weld strength than that of Example 1.

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLE 2

Specimens were prepared in the same manner as in Example 1, except for using pellets of a nylon 6 homopolymer having a relative viscosity of 2.6 as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLE 3

Specimens were prepared in the same manner as in Example 1, except for using pellets of a nylon 66 homopolymer having a relative viscosity of 2.6 as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

The composition of the reinforced polyamide resin (A) and non-reinforced polyamide resin (B) used in Examples 1 to 3 and Comparative Example 1, the weight ratio of (A) and (B), and physical properties of the specimens are shown in Table 1 below.

TABLE 1

|  | Example 1 | Compara. Example 1 | Example 2 | Example 3 |
|---|---|---|---|---|
| Reinforced Polyamide Resin (A) | | | | |
| Polyamide resin (part by weight) | nylon 6 (100) | nylon 6 (100) | nylon 6 (100) | nylon 6 (100) |
| Layered silicate (part by weight) | fluoro-mica (6.6) | fluoro-mica (3.3) | fluoro-mica (6.6) | fluoro-mica (6.6) |
| Non-reinforced Polyamide Resin (B) | | | | |
| Polyamide resin (part by weight) | nylon 6 | — | nylon 6 | nylon 66 |
| Nucleating agent (wt %) | talc (0.3) | — | — | — |
| (A)/(B) (by weight) | 50/50 | 100/0 | 50/50 | 50/50 |
| Physical Properties of Specimen | | | | |
| Relative viscosity | 2.6 | 2.6 | 2.6 | 2.6 |
| Tensile weld strength (MPa) | 54 | 39 | 52 | 55 |
| Tensile strength (MPa) | 92 | 90 | 90 | 92 |
| Tensile modulus (GPa) | 3.7 | 3.7 | 3.6 | 3.8 |
| Tensile elongation at break (%) | 25 | 15 | 28 | 22 |
| Flexural strength (MPa) | 152 | 150 | 150 | 154 |
| Flexural modulus (GPa) | 5.0 | 5.0 | 4.8 | 5.1 |
| Izod impact strength (J/m) | 61 | 57 | 62 | 58 |
| Heat distortion temp. (° C.) | 145 | 144 | 143 | 148 |

Note: Fluoromica: swelling fluoromica group mineral

EXAMPLE 4

In a 30 l volume reactor were charged 10 kg of ε-caprolactam, 0.5 kg of an swelling fluoromica group mineral, 0.4 kg of water, and 25 g of 85% by weight phosphoric acid, and the pressure was elevated up to 5 kg/cm$^2$ while stirring. The reaction system was maintained at a temperature of 260° C. and a pressure of 5 kg/cm$^2$ for 2 hours to conduct polymerization while gradually releasing steam, followed by pressure release to atmospheric pressure over a 1 hour period. After being left under conditions of atmospheric pressure and 260° C. for 30 minutes, the reaction mixture was withdrawn in strands, cooled to solidify, and cut to obtain pellets of reinforced polyamide resin (A) consisting of the swelling fluoromica group mineral and a nylon 6 homopolymer. The pellets were refined in 95° C. hot water for 8 hours twice and dried in vacuo.

Fifty parts by weight of the resulting pellets and 50 parts by weight of nylon 6 homopolymer pellets containing 0.3% by weight of talc and having a relative viscosity of 2.6 were mixed and injection molded in the same manner as in Example 1 to prepare 3.2 mm thick specimens for testing.

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLES 5 TO 7

Specimens were prepared in the same manner as in Example 4, except for replacing the swelling fluoromica group mineral with montmorillonite (Example 5), hectorite (Example 6) or vermiculite (Example 7) as a layered silicate.

The pellet of reinforced polyamide resin (A) as refined and dried was subjected to wide-angle X-ray diffractometry. As a result, it was confirmed that the peak assigned to the thickness direction of the respective layered silicate (12–13 Å) completely disappeared, proving that the swelling fluoromica group mineral was uniformly dispersed on the molecular level in the nylon 6 homopolymer matrix.

The composition of the reinforced polyamide resin (A) and non-reinforced polyamide resin (B) used in Examples 4 to 7, the weight ratio of (A) and (B), and physical properties of the specimens are shown in Table 2 below.

TABLE 2

|  | Example 4 | Example 5 | Example 6 | Example 7 |
|---|---|---|---|---|
| Reinforced Polyamide Resin (A) | | | | |
| Polyamide resin (part by weight) | nylon 6 (100) | nylon 6 (100) | nylon 6 (100) | nylon 6 (100) |
| Layered silicate (part by weight) | fluoro-mica (5.5) | montmorillonite (5.5) | hecto-rite (5.5) | vermi-culite (5.5) |
| Non-reinforced Polyamide Resin (B) | | | | |
| Polyamide resin (part by weight) | nylon 6 | nylon 6 | nylon 6 | nylon 6 |
| Nucleating agent (wt %) | talc (0.3) | talc (0.3) | talc (0.3) | talc (0.3) |
| (A)/(B) (by weight) | 50/50 | 50/50 | 50/50 | 50/50 |
| Physical Properties of Specimen | | | | |
| Relative viscosity | 2.6 | 2.6 | 2.6 | 2.6 |
| Tensile weld strength (MPa) | 58 | 57 | 57 | 56 |
| Tensile strength (MPa) | 92 | 91 | 92 | 91 |
| Tensile modulus (GPa) | 3.6 | 3.5 | 3.5 | 3.5 |
| Tensile elongation at break (%) | 33 | 35 | 30 | 32 |
| Flexural strength (MPa) | 154 | 151 | 152 | 151 |
| Flexural modulus (GPa) | 4.8 | 4.7 | 4.8 | 4.7 |
| Izod impact strength (J/m) | 62 | 58 | 62 | 60 |
| Heat distortion temp. (° C.) | 146 | 144 | 143 | 144 |

Note: Fluoromica: swelling fluoromica group mineral

EXAMPLE 8

Specimens were prepared in the same manner as in Example 4, except for using pellets of a nylon 6 homopolymer having a relative viscosity of 2.6 as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLE 9

Specimens were prepared in the same manner as in Example 4, except for using pellets of a nylon 66 homopolymer having a relative viscosity of 2.6 as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLES 10 AND 11

Specimens were prepared in the same manner as in Example 8, except for changing the (A)/(B) mixing ratio as shown in Table 3 below.

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

The composition of the reinforced polyamide resin (A) and non-reinforced polyamide resin (B) used in Examples 8 to 11, the weight ratio of (A) and (B), and physical properties of the specimens are shown in Table 3.

TABLE 3

|  | Example 8 | Example 9 | Example 10 | Example 11 |
|---|---|---|---|---|
| Reinforced Polyamide Resin (A) | | | | |
| Polyamide resin (part by weight) | nylon 6 (100) | nylon 6 (100) | nylon 6 (100) | nylon 6 (100) |
| Layered silicate (part by weight) | fluoromica (5.5) | fluoromica (5.5) | fluoromica (5.5) | fluoromica (5.5) |
| Non-reinforced Polyamide Resin (B) | | | | |
| Polyamide resin (part by weight) | nylon 6 | nylon 66 | nylon 6 | nylon 6 |
| Nucleating agent (wt %) | — | — | — | — |
| (A)/(B) (by weight) | 50/50 | 50/50 | 25/75 | 75/25 |
| Physical Properties of Specimen | | | | |
| Relative viscosity | 2.6 | 2.6 | 2.6 | 2.6 |
| Tensile weld strength (MPa) | 52 | 50 | 55 | 52 |
| Tensile strength (MPa) | 90 | 90 | 90 | 93 |
| Tensile modulus (GPa) | 3.4 | 3.5 | 3.3 | 3.7 |
| Tensile elongation at break (%) | 30 | 25 | 55 | 23 |
| Flexural strength (MPa) | 151 | 150 | 150 | 154 |
| Flexural modulus (GPa) | 4.7 | 4.8 | 4.5 | 5.1 |
| Izod impact strength (J/m) | 59 | 57 | 62 | 56 |
| Heat distortion temp. (° C.) | 143 | 144 | 140 | 151 |

Note: Fluoromica: swelling fluoromica group mineral

EXAMPLE 12

Specimens were prepared in the same manner as in Example 4, except for using pellets of a nylon 6 homopolymer having a relative viscosity of 2.6 and containing 0.5% by weight of silica as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLE 13

Specimens were prepared in the same manner as in Example 4, except for using pellets of a nylon 6 homopolymer having a relative viscosity of 2.6 and containing 0.5% by weight of kaolin as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLE 14

Specimens were prepared in the same manner as in Example 4, except for using pellets of a nylon 6 homopolymer having a relative viscosity of 2.6 and containing 0.5% by weight of graphite as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLE 15

Specimens were prepared in the same manner as in Example 4, except for using pellets of a nylon 6 homopolymer having a relative viscosity of 2.6 and containing 0.5% by weight of magnesium oxide as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

EXAMPLE 16

Specimens were prepared in the same manner as in Example 4, except for using pellets of a nylon 6 homopolymer having a relative viscosity of 2.6 and containing 0.5% by weight of aluminum oxide as non-reinforced polyamide resin (B).

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

The composition of the reinforced polyamide resin (A) and non-reinforced polyamide resin (B) used in Examples 12 to 16, the weight ratio of (A) and (B), and physical properties of the specimens are shown in Table 4.

TABLE 4

| | Example No. | | | | |
|---|---|---|---|---|---|
| | 12 | 13 | 14 | 15 | 16 |
| Reinforced Polyamide Resin (A) | | | | | |
| Polyamide resin (part by weight) | nylon 6 (100) | nylon 6 (100) | nylon 6 (100) | nylon 6 (100) | nylon 6 (100) |
| Layered silicate (part by weight) | fluoromica (5.5) | fluoromica (5.5) | fluoromica (5.5) | fluoromica (5.5) | fluoromica (5.5) |
| Non-reinforced Polyamide Resin (B) | | | | | |
| Polyamide resin (part by weight) | nylon 6 | nylon 6 | nylon 6 | nylon 6 | nylon 6 |
| Nucleating agent (wt %) | silica (0.5) | kaolin (0.5) | graphite (0.5) | MgO (0.5) | $Al_2O_3$ (0.5) |
| (A)/(B) (by weight) | 50/50 | 50/50 | 50/50 | 50/50 | 50/50 |
| Physical Properties of Specimen | | | | | |
| Relative viscosity | 2.6 | 2.6 | 2.6 | 2.6 | 2.6 |
| Tensile weld strength (MPa) | 52 | 53 | 51 | 52 | 51 |
| Tensile strength (MPa) | 89 | 90 | 88 | 90 | 89 |
| Tensile modulus (GPa) | 3.4 | 3.5 | 3.4 | 3.4 | 3.4 |
| Tensile elongation at break (%) | 25 | 28 | 24 | 22 | 22 |
| Flexural strength (MPa) | 152 | 151 | 150 | 151 | 150 |
| Flexural modulus (GPa) | 4.7 | 4.8 | 4.6 | 4.6 | 4.6 |
| Izod impact strength (J/m) | 58 | 56 | 56 | 57 | 56 |
| Heat distortion temp. (° C) | 144 | 145 | 143 | 143 | 143 |

Note: Fluoromica: swelling fluoromica group mineral

Comparative Example 2

In a 30 l volume reactor were charged 10 kg of ε-caprolactam, 0.25 kg of an swelling fluoromica group mineral, 0.2 kg of water, and 13 g of 85% by weight phosphoric acid, and the pressure was elevated up to 5 kg/cm² while stirring. The reaction system was maintained at a temperature of 260° C. and a pressure of 5 kg/cm² for 2 hours to conduct polymerization while gradually releasing steam, followed by pressure release to atmospheric pressure over a 1 hour period. After being left under conditions of atmospheric pressure and 260° C. for 30 minutes, the reaction mixture was withdrawn in strands, cooled to solidify, and cut to obtain pellets of reinforced polyamide resin (A) consisting of the swelling fluoromica group mineral and a nylon 6 homopolymer. The pellets were refined in 95° C. hot water for 8 hours twice and dried in vacuo.

The resulting pellets was injection molded in the same manner as in Example 1 to prepare 3.2 mm thick specimens for testing.

The specimen had a lower weld strength than that of Example 4. The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

Comparative Examples 3 to 5

Specimens were prepared in the same manner as in Comparative Example 2, except for replacing the swelling fluoromica group mineral with montmorillonite (Comparative Example 3), hectorite (Comparative Example 4) or vermiculite (Comparative Example 5) as a layered silicate.

The specimen of each Comparative Example had a lower weld strength than that of Example 4.

The pellet of reinforced polyamide resin (A) as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6 homopolymer matrix.

The composition of the reinforced polyamide resin (A) used in Comparative Examples 2 to 5 and physical properties of the specimens are shown in Table 5 below.

TABLE 5

| | Comparative Example No. | | | |
|---|---|---|---|---|
| | 2 | 3 | 4 | 5 |
| Reinforced Polyamide Resin (A) | | | | |
| Polyamide resin (part by weight) | nylon 6 (100) | flylon 6 (100) | nylon 6 (100) | nylon 6 (100) |
| Layered silicate (part by weight) | fluoromica (2.8) | montmorillonite (2.8) | hectorite (2.8) | vermiculite (2.8) |
| Non-reinforced Polyamide Resin (B) | | | | |
| Polyamide resin (part by weight) | — | — | — | — |
| Nucleating agent (wt %) | — | — | — | — |
| (A)/(B) (by weight) | 100/0 | 100/0 | 100/0 | 100/0 |
| Physical Properties of Specimen | | | | |
| Relative viscosity | 2.6 | 2.6 | 2.6 | 2.6 |
| Tensile weld strength (MPa) | 34 | 32 | 32 | 31 |
| Tensile strength (MPa) | 87 | 86 | 86 | 85 |
| Tensile modulus (GPa) | 3.3 | 3.2 | 3.2 | 3.3 |
| Tensile elongation at break (%) | 18 | 16 | 16 | 15 |
| Flexural strength (MPa) | 148 | 147 | 145 | 146 |
| Flexural modulus (GPa) | 4.6 | 4.5 | 4.4 | 4.5 |
| Izod impact strength (J/m) | 55 | 52 | 52 | 53 |
| Heat distortion temp. (° C.) | 142 | 142 | 141 | 141 |

Note: Fluoromica: swelling fluoromica group mineral

EXAMPLE 17

In a 30 l volume reactor were charged 9 kg of ε-caprolactam, 1 kg of hexamethylenediamine adipate, 0.6 kg of an swelling fluoromica group mineral, 0.5 kg of water, and 30 g of phosphorous acid, and the pressure was elevated up to 18 kg/cm² while stirring. The reaction system was maintained at a temperature of 270° C. and a pressure of 18 kg/cm² for 2 hours to conduct polymerization while gradually releasing steam, followed by pressure release to atmospheric pressure over a 1 hour period. After being left under conditions of atmospheric pressure and 260° C. for 30 minutes, the reaction mixture was withdrawn in strands, cooled to solidify, and cut to obtain pellets of reinforced polyamide resin (A') consisting of the swelling fluoromica group mineral and a nylon 6/66 copolymer. The pellets were refined in 95° C. hot water for 8 hours twice and dried in vacuo.

The 6/66 copolymer in the reinforced polyamide resin (A') contained 94 mol % of a caproamide unit as measured by $^{13}$C-NMR analysis.

Fifty parts by weight of the resulting pellets and 50 parts by weight of nylon 6 homopolymer pellets containing 0.3% by weight of talc and having a relative viscosity of 2.6 were mixed and injection molded in an injection molding machine (125/75MS Model) at a cylinder temperature of 250° C. and a mold temperature of 70° C. for an injection time of 6 seconds and a cooling time of 6 seconds to prepare 3.2 mm thick specimens for testing.

The pellet of reinforced polyamide resin (A') as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6/66 copolymer matrix.

EXAMPLE 18

Specimens were prepared in the same manner as in Example 17, except for using pellets of a nylon 66 homopolymer having a relative viscosity of 2.6 and containing 0.3% by weight of talc as non-reinforced polyamide resin (B).

The pellet of reinforced polyamide resin (A') as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6/66 copolymer matrix.

Comparative Examples 6

In a 30 l volume reactor were charged 9 kg of ε-caprolactam, 1 kg of hexamethylenediamine adipate, 0.3 kg of an swelling fluoromica group mineral, 0.28 kg of water, and 15 g of phosphorous acid, and the pressure was elevated up to 18 kg/cm$^2$ while stirring. The reaction system was maintained at a temperature of 270° C. and a pressure of 18 kg/cm$^2$ for 2 hours to conduct polymerization while gradually releasing steam, followed by pressure release to atmospheric pressure over a 1 hour period. After being left under conditions of atmospheric pressure and 260° C. for 30 minutes, the reaction mixture was withdrawn in strands, cooled to solidify, and cut to obtain pellets of reinforced polyamide resin (A') consisting of the swelling fluoromica group mineral and a nylon 6/66 copolymer. The pellets were refined in 95° C. hot water for 8 hours twice and dried in vacuo.

The 6/66 copolymer in the reinforced polyamide resin (A') contained 94 mol % of a caproamide unit as measured by $^{13}$C-NMR analysis.

The resulting pellets was injection molded in the same manner as in Example 17 to prepare 3.2 mm thick specimens for testing.

The specimen had a lower weld strength than that of Example 17.

The pellet of reinforced polyamide resin (A') as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6/66 copolymer matrix.

The composition of the reinforced polyamide resin (A') and non-reinforced polyamide resin (B) used in Examples 17 and 18 and Comparative Example 6, the weight ratio of (A') and (B), and physical properties of the specimens are shown in Table 6 below.

TABLE 6

|  | Example 17 | Example 18 | Compara. Example 6 |
|---|---|---|---|
| Reinforced Polyamide Resin (A') | | | |
| Polyamide resin (part by weight) | nylon 6/66 (100) | nylon 6/66 (100) | nylon 6/66 (100) |
| Layered silicate (part by weight) | fluoro-mica (6.6) | fluoro-mica (6.6) | fluoro-mica (3.3) |
| Non-reinforced Polyamide Resin (B) | | | |
| Polyamide resin (part by weight) | nylon 6 | nylon 66 | — |
| Nucleating agent (wt %) | talc (0.3) | talc (0.3) | — |
| (A')/(B) (by weight) | 50/50 | 50/50 | 100/0 |
| Physical Properties of Specimen | | | |
| Relative viscosity | 2.6 | 2.6 | 2.6 |
| Tensile weld strength (MPa) | 60 | 58 | 37 |
| Tensile strength (MPa) | 86 | 85 | 82 |
| Tensile modulus (GPa) | 3.5 | 3.5 | 3.4 |
| Tensile elongation at break (%) | 40 | 36 | 33 |
| Flexural strength (MPa) | 150 | 148 | 145 |
| Flexural modulus (GPa) | 4.4 | 4.4 | 4.4 |
| Izod impact strength (J/m) | 64 | 62 | 55 |
| Heat distortion temp. (° C.) | 141 | 140 | 135 |

Note: Fluoromica: swelling fluoromica group mineral

EXAMPLE 19

In a 30 l volume reactor were charged 9 kg of ε-caprolactam, 1 kg of ω-laurolactam, 0.6 kg of an swelling fluoromica group mineral, 0.5 kg of water, and 30 g of phosphorous acid. The mixture was heated to 280° C., and the pressure was elevated up to 22 kg/cm$^2$ while stirring. The reaction system was maintained at a temperature of 300° C. and a pressure of 22 kg/cm$^2$ for 12 hours to conduct polymerization while gradually releasing steam, followed by pressure release to atmospheric pressure over a 1 hour period. After being left under conditions of atmospheric pressure and 290° C. for 40 minutes, the reaction mixture was withdrawn in strands, cooled to solidify, and cut to obtain pellets of reinforced polyamide resin (A') consisting of the swelling fluoromica group mineral and a nylon 6/12 copolymer. The pellets were refined in 95° C. hot water for 8 hours twice and dried in vacuo.

The 6/12 copolymer in the reinforced polyamide resin (A') contained 92 mol % of a caproamide unit as measured by $^{13}$C-NMR analysis.

Fifty parts by weight of the resulting pellets and 50 parts by weight of nylon 6 homopolymer pellets containing 0.3% by weight of talc and having a relative viscosity of 2.6 were mixed and injection molded in the same manner as in Example 17 to prepare 3.2 mm thick specimens for testing.

The pellet of reinforced polyamide resin (A') as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6/12 copolymer matrix.

EXAMPLE 20

Specimens were prepared in the same manner as in Example 19, except for using pellets of a nylon 66 homopolymer having a relative viscosity of 2.6 and containing 0.3% by weight of talc as non-reinforced polyamide resin (B).

The pellet of reinforced polyamide resin (A') as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6/12 copolymer matrix.

Comparative Examples 7

In a 30 l volume reactor were charged 9 kg of ε-caprolactam, 1 kg of ω-laurolactam, 0.3 kg of an swelling fluoromica group mineral, 0.28 kg of water, and 15 g of phosphorous acid. The mixture was heated to 280° C., and the pressure was elevated up to 22 kg/cm² while stirring. The reaction system was maintained at a temperature of 300° C. and a pressure of 22 kg/cm² for 12 hours to conduct polymerization while gradually releasing steam, followed by pressure release to atmospheric pressure over a 1 hour period. After being left under conditions of atmospheric pressure and 290° C. for 40 minutes, the reaction mixture was withdrawn in strands, cooled to solidify, and cut to obtain pellets of reinforced polyamide resin (A') consisting of the swelling fluoromica group mineral and a nylon 6/12 copolymer. The pellets were refined in 95° C. hot water for 8 hours twice and dried in vacuo.

The 6/12 copolymer in the reinforced polyamide resin (A') contained 92 mol % of a caproamide unit as measured by $^{13}$C-NMR analysis.

The resulting pellets were injection molded in the same manner as in Example 17 to prepare 3.2 mm thick specimens for testing.

The specimen had a lower weld strength than that of Example 19.

The pellet of reinforced polyamide resin (A') as refined and dried was subjected to wide-angle X-ray diffractometry. As a result, it was confirmed that the peak assigned to the thickness direction of the swelling fluoromica group mineral (12–13 Å) completely disappeared, proving that the swelling fluoromica group mineral was uniformly dispersed on the molecular level in the nylon 6/12 copolymer matrix.

The composition of the reinforced polyamide resin (A') and non-reinforced polyamide resin (B) used in Examples 19 and 20 and Comparative Example 7, the weight ratio of (A') and (B), and physical properties of the specimens are shown in Table 7 below.

TABLE 6

|  | Example 19 | Example 20 | Compara. Example 7 |
|---|---|---|---|
| Reinforced Polyamide Resin (A') | | | |
| Polyamide resin (part by weight) | nylon 6/12 (100) | nylon 6/12 (100) | nylon 6/12 (100) |
| Layered silicate (part by weight) | fluoro-mica (6.6) | fluoro-mica (6.6) | fluoro-mica (3.3) |

TABLE 6-continued

|  | Example 19 | Example 20 | Compara. Example 7 |
|---|---|---|---|
| Non-reinforced polyamide Resin (B) | | | |
| Polyamide resin (part by weight) | nylon 6 | nylon 66 | — |
| Nucleating agent (wt %) | talc (0.3) | talc (0.3) | — |
| (A')/(B) (by weight) | 50/50 | 50/50 | 100/0 |
| Physical Properties of Specimen | | | |
| Relative viscosity | 2.6 | 2.6 | 2.6 |
| Tensile weld strength (MPa) | 63 | 61 | 38 |
| Tensile strength (MPa) | 85 | 82 | 80 |
| Tensile modulus (GPa) | 3.5 | 3.5 | 3.3 |
| Tensile elongation at break (%) | 45 | 40 | 32 |
| Flexural strength (MPa) | 150 | 151 | 142 |
| Flexural modulus (GPa) | 4.3 | 4.3 | 4.0 |
| Izod impact strength (J/m) | 65 | 61 | 56 |
| Heat distortion temp. (° C.) | 140 | 141 | 133 |

Note: Fluoromica: swelling fluoromica group mineral

While the invention has been described in detail and with reference to specific examples thereof, it will be apparent to one skilled in the art that various changes and modifications can be made therein without departing from the spirit and scope thereof.

What is claimed is:

1. A polyamide resin composition comprising (A) a reinforced polyamide resin which comprises 100 parts by weight of a nylon 6 homopolymer and 1 to 20 parts by weight of a layered silicate uniformly dispersed in the nylon 6 homopolymer on the molecular level and (B) a non-reinforced polyamide resin, a test specimen of said composition having a tensile weld strength of 45 MPa or higher and a flexural modulus of 4 GPa or higher.

2. A polyamide resin composition according to claim 1, wherein said non-reinforced polyamide resin (B) is a nylon 6 homopolymer.

3. A polyamide resin composition according to claim 1, wherein said non-reinforced polyamide resin (B) is a nylon 66 homopolymer.

4. A polyamide resin composition according to claim 1, wherein said non-reinforced polyamide resin (B) further comprises not more than 1% by weight of at least one nucleating agent selected from the group consisting of talc, silica, kaolin, graphite, magnesium oxide, and aluminum oxide.

5. A polyamide resin composition according to claim 2, wherein said non-reinforced polyamide resin (B) further comprises not more than 1% by weight of at least one nucleating agent selected from the group consisting of talc, silica, kaolin, graphite, magnesium oxide, and aluminum oxide.

6. A polyamide resin composition according to claim 3, wherein said non-reinforced polyamide resin (B) further comprises not more than 1% by weight of at least one nucleating agent selected from the group consisting of talc, silica, kaolin, graphite, magnesium oxide, and aluminum oxide.

7. A polyamide resin composition comprising (A') a reinforced polyamide resin which comprises 100 parts by weight of a nylon 6 copolymer comprising not less than 80 mol % of a caproamide unit and 1 to 20 parts by weight of a layered silicate uniformly dispersed in the nylon 6 copolymer on the molecular level and (B) a non-reinforced polyamide resin, a test specimen of said composition having a tensile weld strength of 45 MPa or higher and a flexural modulus of 4 GPa or higher.

8. A polyamide resin composition according to claim 7, wherein said non-reinforced polyamide resin (B) is a nylon 6 homopolymer.

9. A polyamide resin composition according to claim 7, wherein said non-reinforced polyamide resin (B) is a nylon 66 homopolymer.

10. A polyamide resin composition according to claim 7, wherein said non-reinforced polyamide resin (B) further comprises not more than 1% by weight of at least one nucleating agent selected from the group consisting of talc, silica, kaolin, graphite, magnesium oxide, and aluminum oxide.

11. A polyamide resin composition according to claim 8, wherein said non-reinforced polyamide resin (B) further comprises not more than 1% by weight of at least one nucleating agent selected from the group consisting of talc, silica, kaolin, graphite, magnesium oxide, and aluminum oxide.

12. A polyamide resin composition according to claim 9, wherein said non-reinforced polyamide resin (B) further comprises not more than 1% by weight of at least one nucleating agent selected from the group consisting of talc, silica, kaolin, graphite, magnesium oxide, and aluminum oxide.

13. A polyamide resin composition according to claim 7, wherein said nylon 6 copolymer is a nylon 6/66 copolymer.

14. A polyamide resin composition according to claim 13, wherein said non-reinforced polyamide resin (B) is a nylon 6 homopolymer.

15. A polyamide resin composition according to claim 13, wherein said non-reinforced polyamide resin (B) is a nylon 66 homopolymer.

16. A polyamide resin composition according to claim 13, wherein said non-reinforced polyamide resin (B) further comprises not more than 1% by weight of at least one nucleating agent selected from the group consisting of talc, silica, kaolin, graphite, magnesium oxide, and aluminum oxide.

17. A polyamide resin composition according to claim 14, wherein said non-reinforced polyamide resin (B) further comprises not more than 1% by weight of at least one nucleating agent selected from the group consisting of talc, silica, kaolin, graphite, magnesium oxide, and aluminum oxide.

18. A polyamide resin composition according to claim 15, wherein said non-reinforced polyamide resin (B) further comprises not more than 1% by weight of at least one nucleating agent selected from the group consisting of talc, silica, kaolin, graphite, magnesium oxide, and aluminum oxide.

19. A polyamide resin composition according to claim 7, wherein said nylon 6 copolymer is a nylon 6/12 copolymer.

20. A polyamide resin composition according to claim 19, wherein said non-reinforced polyamide resin (B) is a nylon 6 homopolymer.

21. A polyamide resin composition according to claim 19, wherein said non-reinforced polyamide resin (B) is a nylon 66 homopolymer.

22. A polyamide resin composition according to claim 19, wherein said non-reinforced polyamide resin (B) further comprises not more than 1% by weight of at least one nucleating agent selected from the group consisting of talc, silica, kaolin, graphite, magnesium oxide, and aluminum oxide.

23. A polyamide resin composition according to claim 20, wherein said non-reinforced polyamide resin (B) further comprises not more than 1% by weight of at least one nucleating agent selected from the group consisting of talc, silica, kaolin, graphite, magnesium oxide, and aluminum oxide.

24. A polyamide resin composition according to claim 21, wherein said non-reinforced polyamide resin (B) further comprises not more than 1% by weight of at least one nucleating agent selected from the group consisting of talc, silica, kaolin, graphite, magnesium oxide, and aluminum oxide.

25. A molded article prepared from a polyamide resin composition comprising (A) a reinforced polyamide resin which comprises 100 parts by weight of a nylon 6 homopolymer and 1 to 20 parts by weight of a layered silicate uniformly dispersed in the nylon 6 homopolymer on the molecular level and (B) a non-reinforced polyamide resin, a test specimen of said composition having a tensile weld strength of 45 MPa or higher and a flexural modulus of 4 GPa or higher.

26. A molded article prepared from a polyamide resin composition comprising (A') a reinforced polyamide resin which comprises 100 parts by weight of a nylon 6 copolymer comprising not less than 80 mol % of a caproamide unit and 1 to 20 parts by weight of a layered silicate uniformly dispersed in the nylon 6 copolymer on the molecular level and (B) a non-reinforced polyamide resin, a test specimen of said composition having a tensile weld strength of 45 MPa or higher and a flexural modulus of 4 GPa or higher.

* * * * *